United States Patent
Alvarado et al.

(10) Patent No.: US 11,313,317 B2
(45) Date of Patent: Apr. 26, 2022

(54) CRANKCASE VENTILATION SYSTEM WITH DEAD SPACE ALIGNMENT SLEEVES

(71) Applicant: ONBOARD DYNAMICS LLC, Bend, OR (US)

(72) Inventors: Caleb A. Alvarado, Fort Collins, CO (US); Peter William Rhoades, Fort Collins, CO (US)

(73) Assignee: ONBOARD DYNAMICS LLC, Bend, OR (US)

( * ) Notice: Subject to any disclaimer, the term of this patent is extended or adjusted under 35 U.S.C. 154(b) by 147 days.

(21) Appl. No.: 16/625,420

(22) PCT Filed: Jun. 27, 2018

(86) PCT No.: PCT/US2018/039662
§ 371 (c)(1),
(2) Date: Dec. 20, 2019

(87) PCT Pub. No.: WO2019/027594
PCT Pub. Date: Feb. 7, 2019

(65) Prior Publication Data
US 2021/0363938 A1    Nov. 25, 2021

Related U.S. Application Data

(60) Provisional application No. 62/540,001, filed on Aug. 1, 2017.

(51) Int. Cl.
*F02F 3/00*   (2006.01)
*F02F 3/28*   (2006.01)
(Continued)

(52) U.S. Cl.
CPC ............... *F02F 3/28* (2013.01); *F02B 75/28* (2013.01); *F02F 1/004* (2013.01); *F02F 1/18* (2013.01); *F16C 5/00* (2013.01)

(58) Field of Classification Search
CPC ...... F01B 7/20; F01B 1/00; F16C 5/00; B60T 11/20
(Continued)

(56) References Cited

U.S. PATENT DOCUMENTS

| 1,743,558 A | 1/1930 | Mccabe |
| 3,724,432 A | 4/1973 | Tonnessen |

(Continued)

OTHER PUBLICATIONS

PCT Patent Application No. PCT/US2018/039662, International Search Report and Written Opinion dated Aug. 30, 2018.
(Continued)

*Primary Examiner* — Long T Tran
*Assistant Examiner* — James J Kim
(74) *Attorney, Agent, or Firm* — Leber IP Law; Shelly M. Fujikawa

(57) ABSTRACT

A cylinder aligning sleeve and adapter plate for use within an internal combustion engine. The sleeve includes apertures placed contiguously with holes within the adapter plate to form a flow passage through the dead space between compression and crosshead pistons. The flow passage exits to a vent line where gas detection may occur along with safe venting of any gas detected. The sleeve serves to ensure concentric alignment of the compression cylinder with the engine block bore.

12 Claims, 5 Drawing Sheets

(51) Int. Cl.
  *F02B 75/28* (2006.01)
  *F02F 1/00* (2006.01)
  *F02F 1/18* (2006.01)
  *F16C 5/00* (2006.01)

(58) Field of Classification Search
  USPC .................................................... 123/193.6
  See application file for complete search history.

(56) References Cited

U.S. PATENT DOCUMENTS

| | | | | |
|---|---|---|---|---|
| 5,113,805 A | * | 5/1992 | Kawamura | ............. F02B 69/06 |
| | | | | 123/188.5 |
| 5,400,751 A | | 3/1995 | Grimmer et al. | |
| 5,421,293 A | | 6/1995 | Noltemeyer et al. | |
| 5,509,382 A | * | 4/1996 | Noland | ................... F02B 41/06 |
| | | | | 123/66 |
| 6,145,488 A | | 11/2000 | Plechner | |
| 8,573,178 B2 | * | 11/2013 | Cleeves | .................... F01L 5/06 |
| | | | | 123/312 |
| 2007/0017478 A1 | * | 1/2007 | Noland | ................... F02B 41/00 |
| | | | | 123/193.6 |
| 2008/0216480 A1 | * | 9/2008 | Harmon | ................. F01K 11/00 |
| | | | | 60/670 |
| 2016/0319738 A1 | | 11/2016 | Yamada et al. | |

OTHER PUBLICATIONS

Indian Patent Application No. 201917054051, Examination Report dated Jun. 22, 2021, 5 pages.

* cited by examiner

CRANKCASE VENTILATION SYSTEM WITH DEAD SPACE ALIGNMENT SLEEVES

STATEMENT REGARDING FEDERALLY SPONSORED RESEARCH OR DEVELOPMENT

This invention was made with government support under DE-AR0000490 awarded by the U.S. Department of Energy. The government has certain rights in the invention.

FIELD OF THE INVENTION

The present invention relates to internal combustion engine structures. More specifically, the invention relates to structures between the compression and crosshead cylinders.

BACKGROUND

Within the field of internal combustion engines, there exists structures typically including a compression piston within a compression cylinder and linearly coupled to a crosshead piston via a piston rod where the crosshead piston is rotationally coupled to a crank via a connecting rod. This crosshead arrangement transfers the reciprocating movement of the piston rod to the rotating movement of the crank through a gudgeon pin within the crosshead piston thereby moving the connecting rod in both linear and angular directions as is well known in the art.

In this manner, the connecting rod and crosshead piston serves to isolate the compression piston from sideways forces. Any such sideways forces are taken up by a crosshead guide. Without such arrangement to ensure alignment of the piston rod within the compression cylinder, an internal combustion engine's forces would cause an intolerable degree of wear on the compression piston and compression cylinder as well as increasing overall friction in the engine. Alignment of the compression cylinder is therefore an important goal in engine design and operation.

Crosshead configurations within an internal combustion engine will typically include a space between the crosshead piston and the compression piston where neither piston travels during a piston stroke. This "dead space" contributes to air spring when pressures develop in this space that differ from atmospheric pressure whereby unwanted heat and problematic load pulsations may be generated. Prior known attempts to alleviate this problem has included either drilling flow passages into the crosshead piston or by designing the piston such that it is open to the crankcase below. Both methods allow the trapped air to pass freely from the dead space to the crankcase and back while also allowing oil mist and spray into the compression cylinder. Undesirably, if the compression piston seals leak, this gas goes directly into the crankcase.

The aforementioned structure of an internal combustion engines may be used to compress a gas such as air or natural gas (hydrocarbon gas mixtures consisting primarily of methane). Natural gas is an attractive fuel for vehicles due to its low cost and reduced emissions, including greenhouse gases. However, for effective use as a vehicle fuel, natural gas must be compressed to high pressure (typically 4000 psi).

When an internal combustion engine is used to compress natural gas for vehicle fuel, the engine will contain a plurality of compression cylinders, at least one standard combustion cylinder to drive the plurality of compression cylinders, and a common crankshaft coupling the plurality of compression cylinders and the at least one standard combustion cylinder. Such compression cylinders are in fluid communication with each other and are configured to compress gas in a series of stages. Compression causes the gas to heat whereby gas travels through a heat exchanger after each stage of compression. U.S. Pat. No. 5,400,751, incorporated by reference herein, provides further details regarding natural gas compressors.

It would be useful to provide engine structure to ensure compression cylinder alignment and alleviate problems associated with dead space between the compression cylinder and crosshead cylinder.

SUMMARY

The present invention provides for a useful solution to ensure compression cylinder alignment and alleviate problems associated with dead space between the compression cylinder and crosshead cylinder. Moreover, the present invention is especially useful in natural gas compression systems utilizing compression and crosshead cylinder structure to ensure such systems may operate with greater efficiency and durability.

In accordance with one aspect of the invention, there is provided an internal combustion engine for compressing gas, including: at least one compression cylinder including a compression piston; at least one crosshead piston coupled to the compression piston; and a sleeve located between the compression cylinder and the crosshead piston, the sleeve including a pair of apertures located on opposite sidewalls thereof and allowing a flow passage therebetween.

In accordance with another aspect of the invention, there is provided a locating step on the sleeve so as to ensure alignment of the compression cylinder within a corresponding engine block bore.

Other aspects of the invention will be apparent in the detailed description with reference to the corresponding drawings.

DETAILED DESCRIPTION

The present invention involves dead space alignment sleeves that allow for ventilation among the spaces between compression and crosshead cylinders. The alignment sleeves serve to both ensure compression cylinder alignment and alleviate gas problems within the dead space between the compression cylinder and crosshead cylinder.

Figure 1:
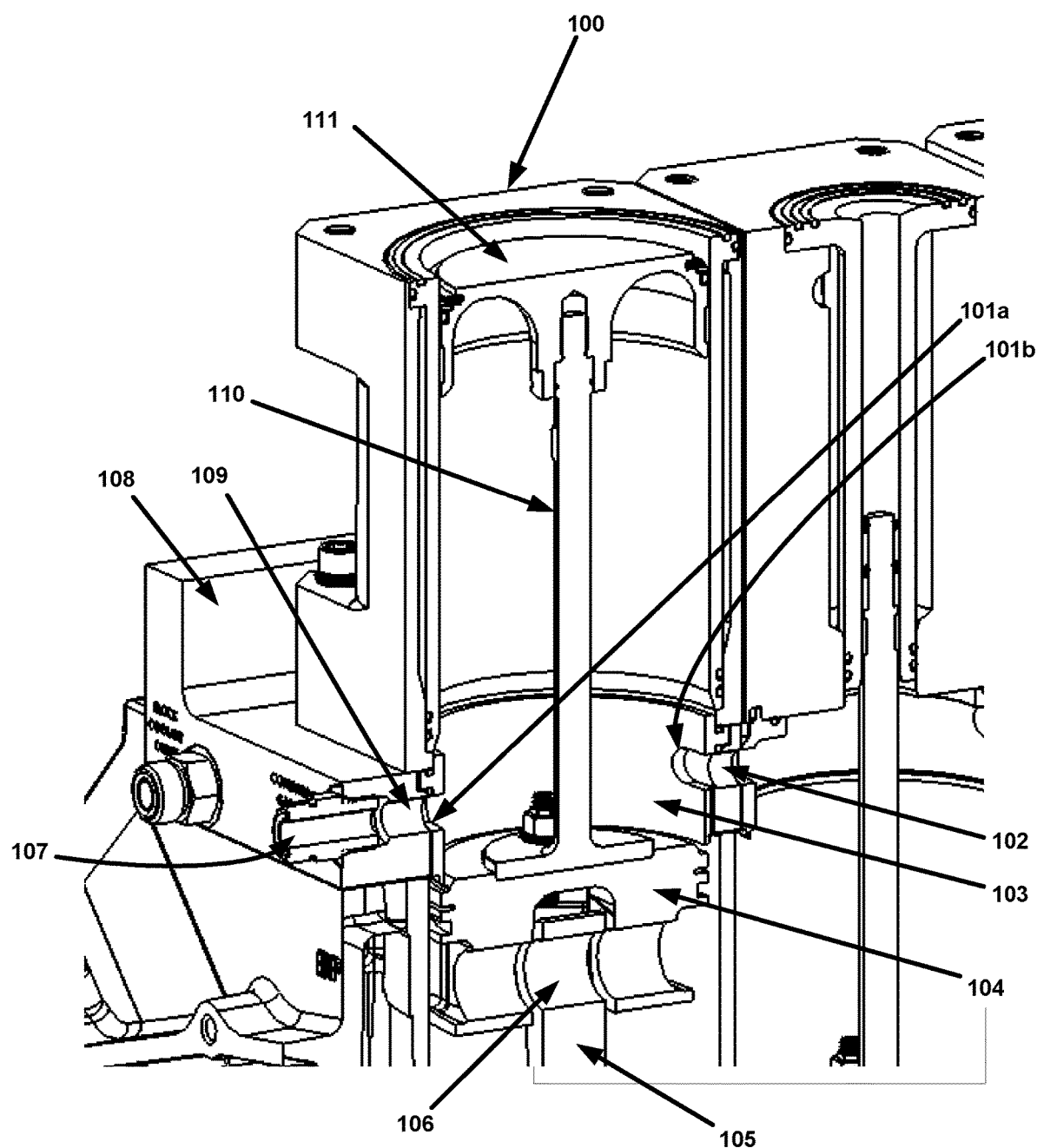
FIG. 1 is a cutaway perspective view showing a compression cylinder in accordance with the present invention.

With regard to FIG. 1, there is shown a cutaway perspective view showing a compression cylinder 100 in accordance with the present invention. A compression piston 111 is connected to a crosshead piston 104 via a piston rod 110. As is typical of a crosshead configuration, the crosshead piston 104 is connected to a connecting rod 105 via a bearing 106 typically in the form of a gudgeon pin. For purposes of clarity of illustration, a gudgeon pin is not shown though such details are well known in the art of crosshead design.

In accordance with the present invention, the dead space between the compression piston 111 and the crosshead piston 104 is shown occupied by a sleeve 103. The sleeve 103 itself is configured to include apertures 101*a* and 101*b* which may be circular or oblong in shape, though an elongated shape (i.e., oblong) may better facilitate arranging the sleeve 103 such that holes 102 and 109 align therewith. The holes 102 and 109 are provided for each compression cylinder 100 within an engine block adapter plate 108. The adapter plate 108 and sleeve 103 thereby form the two basic elements of the present invention.

Figure 2:
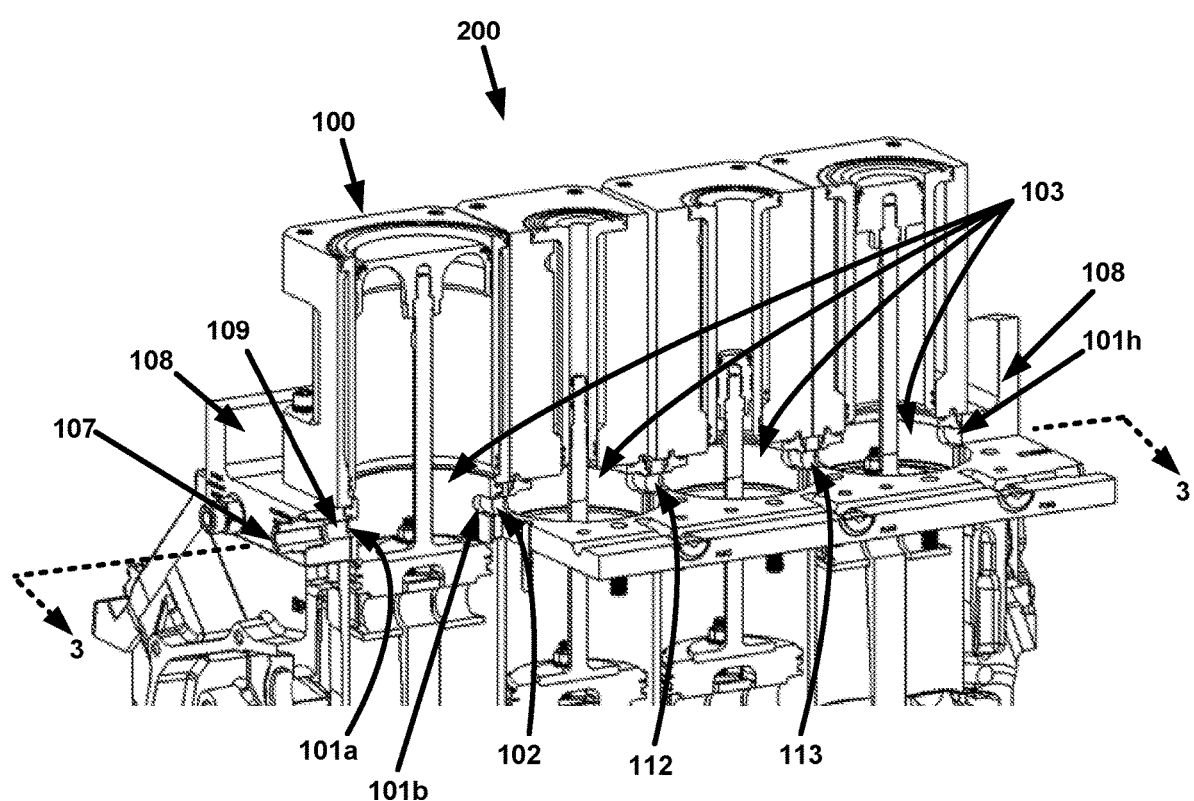
FIG. 2 is a cutaway perspective view showing an engine block of four-cylinder configuration in accordance with the present invention.

It should be readily apparent that an engine block may vary in terms of the number of cylinders provided. FIG. 2 is a cutaway perspective view showing an engine block of four-cylinder configuration in accordance with the present invention. Here, a 4-cylinder configuration 200 is shown incorporating the present invention with the adapter plate 108 and four sleeves 103. Each sleeve 103 is identical in its structure and function, though sleeve size may vary. However, it should be noted that a contiguous passage exists in accordance with the present invention only between holes 109, 102, 112, and 113.

As shown in the 4-cylinder configuration, aperture 101*a* is connected to hole 109 which is then connected to an output port 107. In this manner, each of the dead space volumes for adjacent cylinders are connected. As well, these connected volumes are also connected to a vent line at output port 107 that is plumbed to another location while simultaneously allowing for leakage detection using a sensor in the vent line. This enables a sealed flow passage to exist within adjacent dead spaces. It should be noted that in order to further ensure that flow among adjacent dead spaces is contained within a sealed passage, each crosshead piston includes seals which maintain the integrity of the sealed flow passage. Moreover, this prevents any gas from mixing between the compression cylinder and the crankcase.

Depending upon the given implementation of the present invention, the location to where the dead space is vented may be a safe location that is either closed to the atmosphere such as in a containment arrangement or openly vented to the atmosphere safely away from the internal combustion engine. As such vent line and gas detection equipment are well known elements and not further described herein, any suitable sensing mechanism may be used such as a methane detector.

Figure 3:
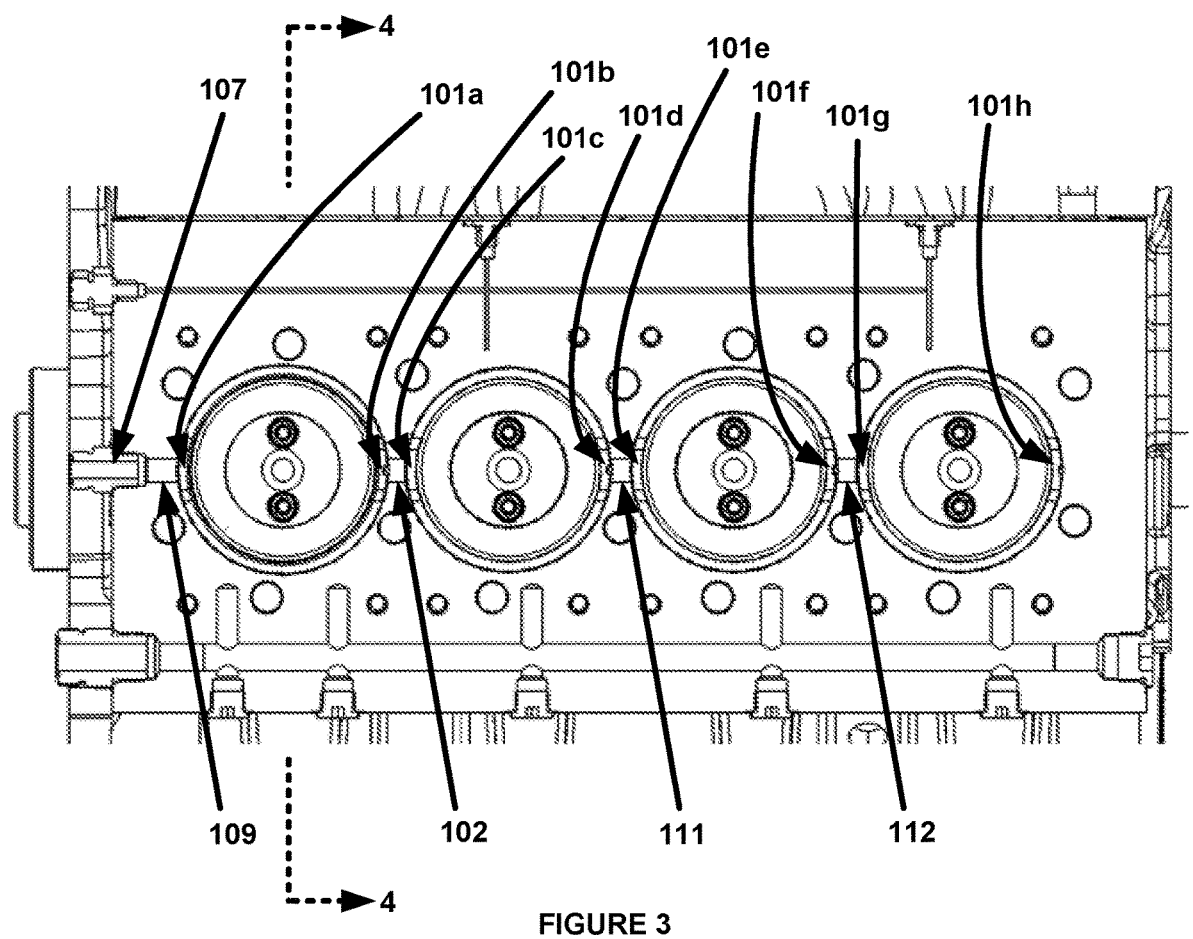
FIG. 3 is a top view of the four-cylinder configuration shown in FIG. 2 taken across line 3-3.

FIG. 3 is a top view of the four-cylinder configuration shown in FIG. 2 taken across line 3-3. In this figure, the flow path is visible from outlet port 107 through hole 109 to aperture 101*a* across dead space to aperture 101*b* through hole 102 to aperture 101*c* across dead space to aperture 101*d* though hole 111 to aperture 101*e* across dead space to aperture 101*f* through hole 112 to aperture 101*g* ending in dead space. While each sleeve includes two apertures, it should be readily apparent that aperture 101*h* abuts a wall of the adapter plate such that nothing would pass through aperture 101*h*. It would therefore be possible to configure an adapter plate with only one aperture such that aperture 101*h* may be eliminated without straying from the intended scope of the present invention. However, simplicity of manufacture renders it preferable to fabricate identical sleeves rather than provide for an end sleeve with only one aperture.

The present invention therefore presents a contained flow path which includes the adapter plate 108, sleeves 103, and outlet port 107. The flow path is contiguous through the dead space of each of one or more piston cylinders. This advantageously avoids any mixing of combustion chamber gases into the crankcase and vice versa. Additional seals may be added to the crosshead piston to further ensure isolation of the dead space from the crankcase.

Figure 4:
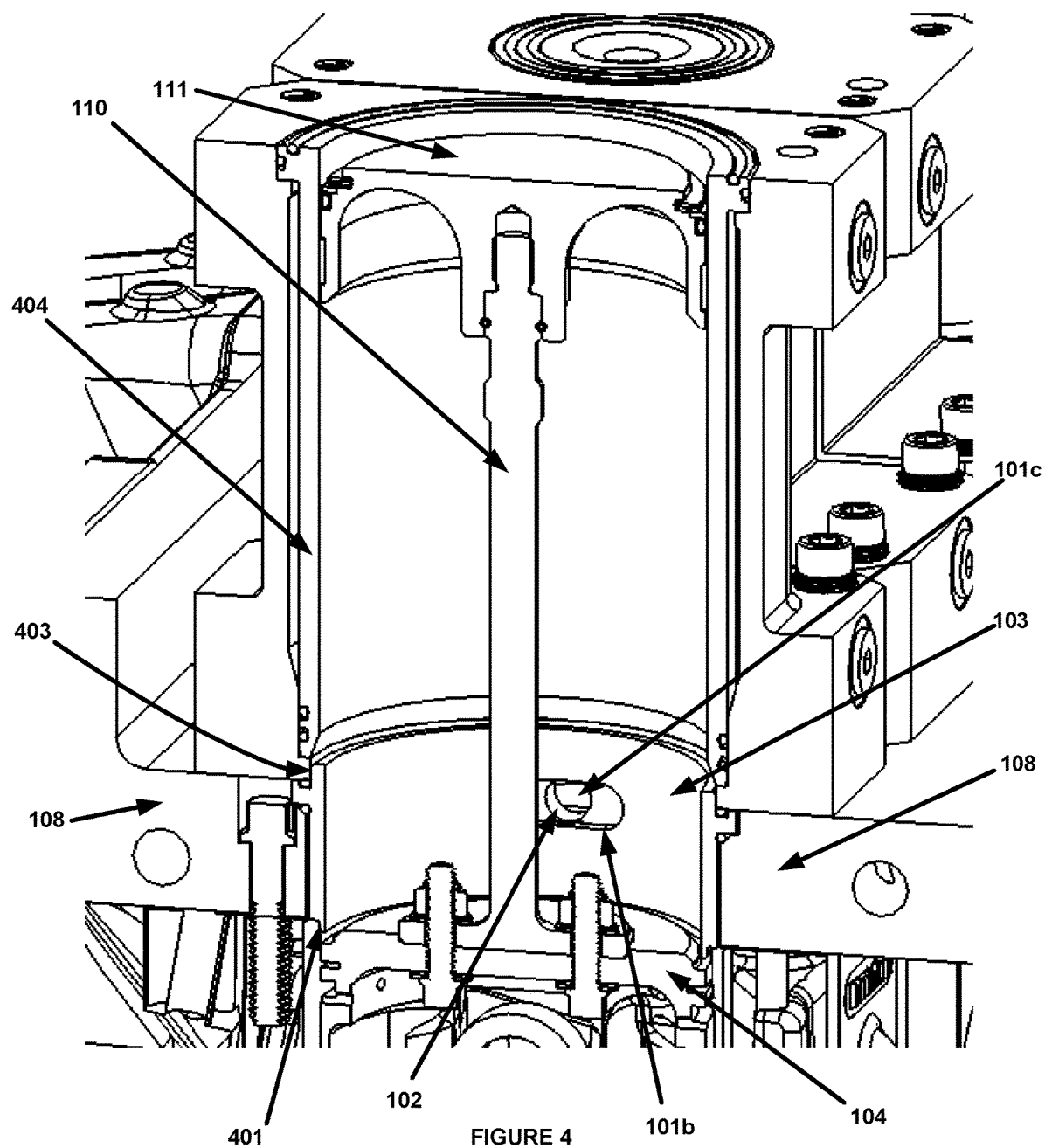
FIG. 4 is a cutaway perspective the four-cylinder configuration shown in FIG. 3 taken across line 4-4.

FIG. 4 is a cutaway perspective the four-cylinder configuration shown in FIG. 3 taken across line 4-4. Here, the alignment of an oval shaped aperture 101*b* with hole 102 and aperture 101*c* is visible. As well, this figure demonstrates the centering capabilities of the sleeve 103. Each sleeve 103 is situated within the adapter plate 108 and protrudes upwards along the inner circumference of a compression cylinder locating step 403. This effectively guides each corresponding compression cylinder 404 onto the related engine bores. A stock bore locating step 401 serves to ensure that the cross-head piston 104 is aligned to the center of the engine bore. In this manner, the compression cylinder 404 is allowed to "float" relative to the other stages and relative to compression cylinder 100 which reduces the need for tight manufacturing tolerances.

The present invention advantageously ensures that the compression cylinders operate concentric to the cylinders in the engine block so as to ensure the pistons do not bind in their bores. Without the present invention, this is difficult to achieve normally because the position tolerance of the bores in the block is relatively large. The present invention however eliminates this concern by allowing the compression cylinders to self-center to the block cylinder to ensure concentricity.

Figure 5:
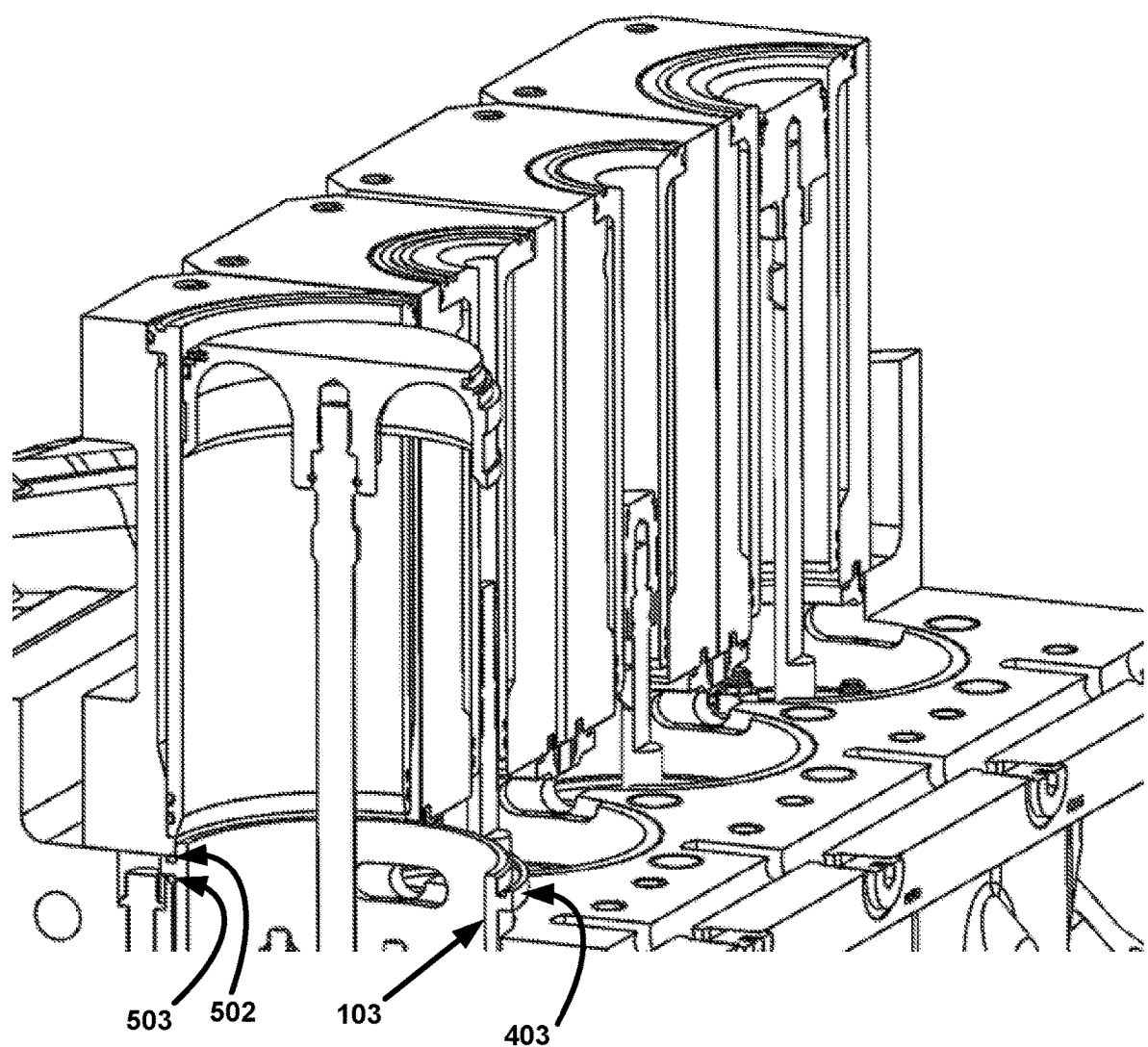
FIG. 5 is another cutaway view perspective view of the four-cylinder configuration shown in FIG. 2.

FIG. 5 is another cutaway view perspective view of the four-cylinder configuration shown in FIG. 2. Here, the compression cylinder locating step 403 is visible at left with seals 502, 503 and at right devoid of seals for purposes of clarity of illustration. The seals 502, 503 are provided to ensure ambient air cannot enter the dead space within the sleeve 103.

The present invention is not to be limited in scope by the specific embodiments described herein. Indeed, various modifications of the invention in addition to those described herein will be apparent to those skilled in the art from the foregoing description. Such modifications are intended to fall within the scope of the appended claims.

All references cited herein, including all patents, published patent applications, and published scientific articles and books, are incorporated by reference in their entireties for all purposes.

What is claimed is:

1. An internal combustion engine for compressing gas, comprising:
   at least one compression cylinder including a compression piston;
   at least one crosshead piston coupled to said compression piston; and
   a sleeve located between said compression cylinder and said crosshead piston, said sleeve including a pair of apertures located on opposite sidewalls thereof and allowing a flow passage therebetween.

2. The internal combustion engine of claim 1, further including an adapter plate within which said sleeve is retained.

3. The internal combustion engine of claim 2, wherein said adapter plate includes at least one hole for alignment with at least one said aperture whereby said flow passage exists through said hole and said aperture.

4. The internal combustion engine of claim 3, further including more than one said compression cylinder, more than one said crosshead piston, and more than one said sleeve, each said sleeve located between a corresponding one of said more than one compression cylinder and said more than one said crosshead piston.

5. The internal combustion engine of claim 4, wherein each said sleeve includes one or more apertures aligned with corresponding holes within said adapter plate and said flow passage exists contiguously from a first end of said adapter plate to a second end of said adapter plate.

6. The internal combustion engine of claim 5, wherein said first end of said adapter plate includes an outlet port for venting gas located within said flow passage.

7. The internal combustion engine of claim 6, wherein said outlet port is coupled to a gas detector.

8. The internal combustion engine of claim 6, wherein said outlet port is coupled to a containment system.

9. The internal combustion engine of claim 6, wherein said outlet port is coupled to atmosphere.

10. The internal combustion engine of claim 2, wherein said sleeve includes a compression cylinder locating step for alignment of a corresponding one said compression cylinder.

11. The internal combustion engine of claim 10, wherein said locating step includes a seal precluding gas movement outside of or into said flow passage.

12. The internal combustion engine of claim 11, wherein said compression cylinder is assured alignment with a corresponding engine block bore via said sleeve through engagement of said compression cylinder with said locating step.

* * * * *